(12) United States Patent
Safai et al.

(10) Patent No.: US 11,493,429 B1
(45) Date of Patent: Nov. 8, 2022

(54) MECHANICAL WAVE MEASUREMENT AND GAS EXCITATION FOR BONDLINE INSPECTION

(71) Applicant: The Boeing Company, Chicago, IL (US)

(72) Inventors: Morteza Safai, Newcastle, WA (US); Ryan M. Clancy, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/371,984

(22) Filed: Jul. 9, 2021

(51) Int. Cl.
*G01N 29/24* (2006.01)
*G01N 19/04* (2006.01)
*G01S 17/58* (2006.01)

(52) U.S. Cl.
CPC ......... *G01N 19/04* (2013.01); *G01N 29/2418* (2013.01); *G01N 29/2431* (2013.01); *G01S 17/58* (2013.01); *G01N 2291/0231* (2013.01)

(58) Field of Classification Search
CPC ............... G01N 29/04; G01N 29/2418; G01N 29/2431; G01N 29/2462; G01N 2291/0231; G01N 19/04; G01S 17/58
See application file for complete search history.

(56) References Cited

U.S. PATENT DOCUMENTS

| | | | |
|---|---|---|---|
| 3,057,188 A * | 10/1962 | Henry ............... | G01N 29/12 367/101 |
| 6,848,321 B2 | 2/2005 | Bossi et al. | |
| 7,770,454 B2 | 8/2010 | Sokol et al. | |
| 9,618,433 B2 | 4/2017 | Housen et al. | |
| 10,753,909 B2 | 8/2020 | Safai | |
| 10,989,675 B1 | 4/2021 | Safai | |
| 2008/0216558 A1* | 9/2008 | Koyilothu ............ | G01N 33/004 977/720 |
| 2019/0170700 A1* | 6/2019 | Clemen, Jr. .......... | G01N 29/069 |

* cited by examiner

*Primary Examiner* — Suman K Nath
(74) *Attorney, Agent, or Firm* — Ostrager Chong Flaherty & Broitman P.C.

(57) ABSTRACT

Systems and methods for bondline inspection using mechanical wave measurement and gas excitation. A cost-effective optical interferometry technique is used to measure mechanical waves generated by gas excitation, which measurements may be used to verify the strength of a bondline of a composite bonded structure. A gas gun which produces a high-pressure short-pulsewidth gas pulse at the front free surface of the composite material. A velocity interferometer system for any reflector (VISAR) is synchronized with the controlled gas pulsation and used to measure the surface velocities. The respective shock wave-induced displacements of the back and front free surfaces are then calculated. The measured free surface displacements are compared with calibrated thresholds to determine whether a weak bond has been detected or not. Optionally, a ring magnet is aligned exactly under the gas gun nozzle to enable VISAR beam centering.

20 Claims, 7 Drawing Sheets

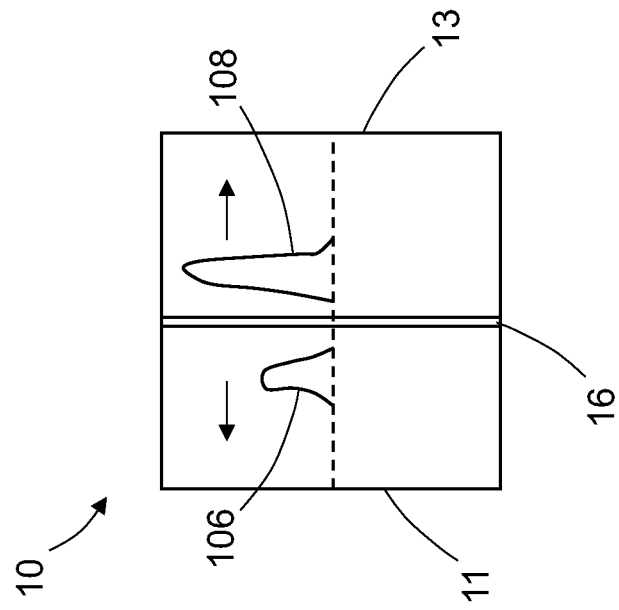
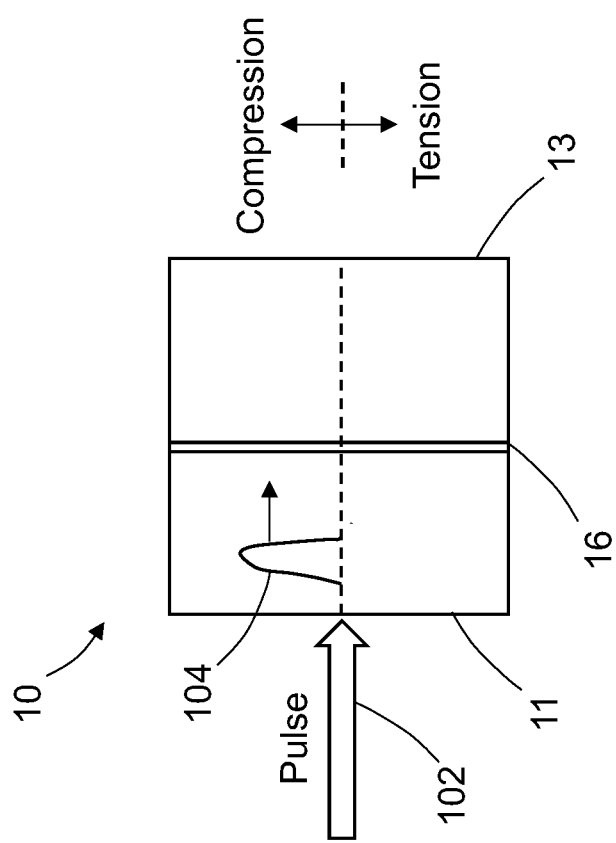
FIG. 1A
FIG. 1B

MECHANICAL WAVE MEASUREMENT AND GAS EXCITATION FOR BONDLINE INSPECTION

BACKGROUND

This disclosure relates to systems and methods for testing the strength of materials and, more particularly, to systems and methods for non-destructive testing of bonds formed within composite materials.

When fabricating laminated structures made of composite material (such as a fiber-reinforced resin matrix), it is necessary to bond plies of fiber-reinforced composite material with adhesives. Since such structures may be used to support loads in aircraft and other vehicles, it is necessary to test the strength and integrity of the bonds of fiber-reinforced composite laminates. It is also preferable to test the integrity of such bonds nondestructively, in view of the cost of fabricating fiber-reinforced composite laminates, and if possible to test the integrity of the bonds at the job site.

Systems have been developed to nondestructively test the integrity of bonds formed within a bonded structure. For example, the Laser Bond Inspection (LBI) method is based upon stress-wave dynamics in bonded materials. LBI uses a high-energy pulsed laser system to generate a compressive stress wave on the material surface. The stress wave propagates through the material and is reflected off the back free surface as a tensile wave. The reflected tensile wave passes through the bondline and interrogates the adhesive bond at a selected strength value. LBI provides proof test validation that structures meet their strength ratings and design requirements.

However, a typical LBI system is designed with a long laser cavity in order to generate laser pulses having a width of 200 nsec and an energy of 15 joules or above. As a result, LBI systems are expensive and bulky. There is a need for a bondline inspection system and method that is relatively compact, low cost, and requires less power than existing conventional LBI systems.

SUMMARY

The subject matter disclosed below is directed to systems and methods for bondline inspection using mechanical wave measurement and gas excitation. A cost-effective optical interferometry technique is used to measure mechanical waves generated by gas excitation, which measurements may be used to verify the strength of a bondline of a composite bonded structure. Each system includes a gas gun which is configured to produce a high-pressure short-pulsewidth gas pulse that produces a compression stress wave (hereinafter "compression wave") at the front free surface of the composite material, which wave propagates to the back free surface. The wave energy is reflected as a tension stress wave (hereinafter "tension wave") at the back free surface, which wave then propagates to the front free surface.

Each system also includes a velocity interferometer system for any reflector (VISAR), which is synchronized with the controlled gas pulsation. The VISAR is configured to measure the surface velocities of the composite material when mechanical waves arrive at free surfaces. The surface velocities are measured for a period of time sufficient to enable calculation of the respective shock wave-induced displacements of the back and front free surfaces. When compared to thresholds retrieved from a calibrated database, the measured free surface displacements enable a determination of whether a weak bond has been detected or not. Optionally, a ring magnet centering technique may be used to align (center) the VISAR laser beam exactly under the gas gun nozzle.

Although various embodiments of systems and methods for bondline inspection using mechanical wave measurement and gas excitation will be described in some detail below, one or more of those embodiments may be characterized by one or more of the following aspects.

One aspect of the subject matter disclosed in detail below is a system for testing a strength of a bond in a bonded structure, the system comprising: a gas gun, a first interferometer, an interferometer control unit, a signal analyzer, a synchronization gated circuit, and an electronic image processor. The gas gun is positioned and configured to produce a gas pulse directed normal to a target area on a front free surface of the bonded structure, the gas pulse having an energy sufficient to excite a compression wave. The first interferometer is located and configured to generate a first light beam in response to activation, split the first light beam into second and third light beams, direct the second light beam toward the target area on the front free surface, direct the third light beam toward an internal mirror, and then capture fringes produced by interference of reflected light of the second light beam which has been reflected by the target area on the front free surface with reflected light of the third light beam which has been reflected by the internal mirror. The interferometer control unit is connected to the first interferometer and configured to control activation of the first interferometer. The signal analyzer is connected to receive first analog data representing captured fringes from the first interferometer and configured to convert the first analog data to first digital data representing the fringes captured by the first interferometer. The synchronization gated circuit is connected and configured to synchronize operation of the gas gun, the interferometer control unit, and the signal analyzer. The electronic image processor is connected to receive the first digital data from the signal analyzer and configured to calculate a first estimated surface velocity of the target area on the front free surface during a period of time subsequent to production of the gas pulse, using the first digital data.

Optionally, the system described in the immediately preceding paragraph may further include a second interferometer located and configured to generate a fourth light beam in response to activation, split the fourth light beam into fifth and sixth light beams, direct the fifth light beam toward a target area on a back free surface, direct the sixth light beam toward an internal mirror, and then capture fringes produced by interference of reflected light of the fifth light beam which has been reflected by the target area on the back free surface with reflected light of the sixth light beam which has been reflected by the internal mirror.

In the case wherein two interferometers are used, the interferometer control unit is connected to the second interferometer and is further configured to control activation of the second interferometer. The signal analyzer is connected to receive second analog data representing captured fringes from the second interferometer and further configured to convert the second analog data to second digital data representing the fringes captured by the second interferometer. The electronic image processor is further configured to: (a) calculate a second estimated surface velocity of the target area on the back free surface during the period of time subsequent to production of the gas pulse, using the second digital data; (b) calculate estimated displacements of the target areas on the front and back free surfaces using the respective estimated surface velocities; and (c) conclude that the bond is weak when either or a weighted average of the estimated displacements exceeds a weak bond threshold displacement value. Optionally, the system may further comprise a ring magnet positioned and configured to surround a volume of space adjacent to the target area on the back free surface in alignment with the gas gun.

Another aspect of the subject matter disclosed in detail below is a method for determining a strength of a bond in a bonded structure, the method comprising: producing a gas pulse that is directed normal to a target area on a front free surface of the bonded structure, the gas pulse having an energy sufficient to excite a compression wave; activating a light source to generate a first light beam; splitting the first light beam into second and third light beams; directing the second light beam toward the target area on the front free surface; directing the third light beam toward a stationary mirror; capturing fringes produced by interference of reflected light of the second light beam which has been reflected by the target area on the front free surface with reflected light of the third light beam which has been reflected by the stationary mirror; converting analog data representing the captured fringes to digital data representing the captured fringes; and calculating an estimated surface velocity of the target area on the front free surface during a period of time subsequent to production of the gas pulse, using the digital data.

A further aspect of the subject matter disclosed in detail below is a method for determining a strength of a bond in a bonded structure, the method comprising: producing a gas pulse that is directed normal to a target area on a front free surface of the bonded structure, the gas pulse having an energy sufficient to excite a compression wave; activating a light source to generate a first light beam; splitting the first light beam into second and third light beams; directing the second light beam toward a target area on a back free surface of the bonded structure; directing the third light beam toward a stationary mirror; capturing fringes produced by interference of reflected light of the second light beam which has been reflected by the target area on the back free surface with reflected light of the third light beam which has been reflected by the stationary mirror; converting analog data representing the captured fringes to digital data representing the captured fringes; and calculating an estimated surface velocity of the target area on the back free surface during a period of time subsequent to production of the gas pulse, using the digital data. An estimated displacement of the target area on the back free surface is calculated using the estimated surface velocity. The estimated displacement is compared to a weak bond threshold displacement value. Optionally, a ring magnet is placed in a position adjacent to the target area on the back free surface of the bonded structure and in alignment with the gas gun.

Other aspects of systems and methods for bondline inspection using mechanical wave measurement and gas excitation are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams are drawn to scale.

FIGS. 1A through 1D are diagrams showing respective positions (at different times) of mechanical waves propagating through a composite material in the thickness direction in response to a gas pulse applied to the front free surface.

Reference will hereinafter be made to the drawings in which similar elements in different drawings bear the same reference numerals.

DETAILED DESCRIPTION

Figure 1C:
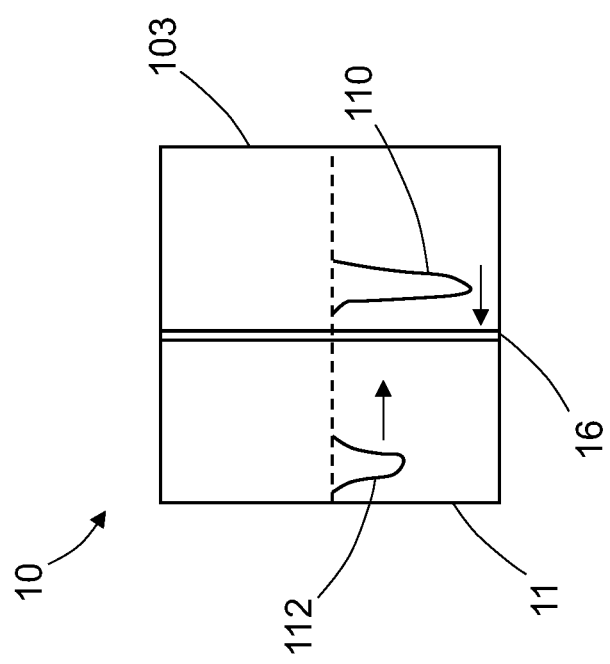

Illustrative embodiments of systems and methods for bondline inspection using mechanical wave measurement and gas excitation are described in some detail below. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Bonds are widely used in a variety of structural applications, and more specifically, primary composite structures are often bonded together in select aerospace applications. Generally, the strength of the bond between composite structures must be known and certifiable if the bond is used in a primary structure application. Conventional methods for measuring bond strength generally involve static and dynamic proof testing of entire structural assemblies, subjected to simulated loads and are monitored for strain levels, which are then correlated to strength values. The structure that is tested, however, is generally a test assembly and is not used in the final assembly of the aircraft. Further, smaller component testing of individual bonds is conducted, but the components are also test assemblies and are not a part of the operational vehicle structure. Moreover, the smaller components are most frequently destructively tested.

Non-destructive inspection (NDI) methods also exist for composite structures assembled with adhesive bonds. Among other techniques, laser bond inspection has proven useful. Laser bond inspection is a method of testing the strength of bonds between composite structures using stress waves. In this technique, weak bonds may be "pulled apart" by tension waves propagating through the structure. VISAR is a time-resolved measurement system that uses laser interferometry to measure the velocity of free surfaces subjected to a shock or impact. More specifically, the interferometer receives laser light which has been reflected from the free surface of the interrogated structure and produces light fringes in proportion to the velocity of the reflecting surface due to the Doppler shift in wavelength. A signal analyzer may be employed to plot the free-surface velocity against time. The VISAR measures the velocity-dependent phase change of laser light reflected from the free surface and then computes the free-surface velocity.

The innovative system and method proposed herein rely upon a cost-effective optical interferometry mechanical wave measurement with gas excitation that can be used for bondline strength verification. The system and method use a VISAR technique which is synchronized with a controlled short burst (pulse) of pressurized gas to generate short compression stress wave on the front free surface of a composite structure (e.g., a composite part). The stress wave propagates through the composite material and is reflected off the back free surface as a tension wave. The reflected tension wave passes through the bondline and interrogates the adhesive bond at a selected strength value. By using respective VISARs on both front and back free surfaces and synchronizing the gas pulse timing with VISAR measurements, one can obtain a clear indication of the bondline strength by measuring the amount that bondline stretches during the interrogation. In the embodiments disclosed below, the VISAR is used to measure both the surface velocity of the mechanical wave and the out-of-plane displacement of surface, which relates to stretching of the bondline due to the tension wave.

In addition, in order for VISAR to provide an accurate reading of the mechanical wave when the bondline undergoes tension following application of a gas pulse on a target area of the front free surface, the VISAR light beams are respectively directed toward the target area on the front free surface and a corresponding (aligned) target area on the back free surface of the composite structure. Optionally, an innovative magnetic centering technique may be employed using a ring magnet that self-aligns exactly under the gas gun nozzle on the opposite side of the composite part. The ring magnet always adjusts its field to align with the gas gun nozzle through the composite part. Therefore, the center of the ring magnet may be coaxial with the center of the gas gun nozzle. A VISAR beam may then be aimed at the center of the ring magnet.

FIGS. 1A through 1D are diagrams showing respective positions (at different times) of mechanical waves propagating through a bonded structure 10 (e.g., a composite structure) in response to a gas pulse 102. The bonded structure 10 has a bond 16. AS seen in FIG. 1A, the gas pulse 102 is applied to a front free surface 11 of the bonded structure 10. The gas pulse 102 generates mechanical waves in the form of compression waves 104 that propagate through bond 16 from the front free surface 11 to the back free surface 13 of bonded structure 10.

As seen FIG. 1B, generally, when a compression wave 104 arrives at the bond 16, a portion of the compression wave 104 passes through the bond 16 to form a transmitted compression wave 108 that is amplified due to the differences in the material properties, namely, the wave speed (i.e., the speed of sound in the material) and density, of the bonded materials. The transmitted compression wave 108 propagates toward and eventually impinges upon the back free surface 13. Another portion of the compression wave 104 reflects off of the bond 16, producing a reflected compression wave 106 that propagates toward the front free surface 11 of bonded structure 100.

FIG. 1C shows a scenario at a time subsequent to the time of the scenario depicted in FIG. 1B. FIG. 1C shows a first tension wave 110 which was produced by reflection of the transmitted compression wave 108 (seen in FIG. 1B) off of the back free surface 13 of bonded structure 100. The first tension wave 110 is shown in FIG. 1C propagates toward the bond 16. In addition, the reflected compression wave 106 (seen in FIG. 1B) has reflected off of the front free surface 11, producing a second tension wave 112 that also propagates toward the bond 16. Typically, the first tension wave 110 reaches the bond 16 first and upon encountering the bond 16, the first tension wave 110 subjects the bond 16 to a desired tensile stress and continues to propagate toward the front free surface 11 of bonded structure 100. If the first tension wave 110 is of sufficient strength and the bond 16 is weak, the bond 16 may fail, for example, by separating, as a result of the tension produced by the impinging tension wave 110.

Figure 1D:
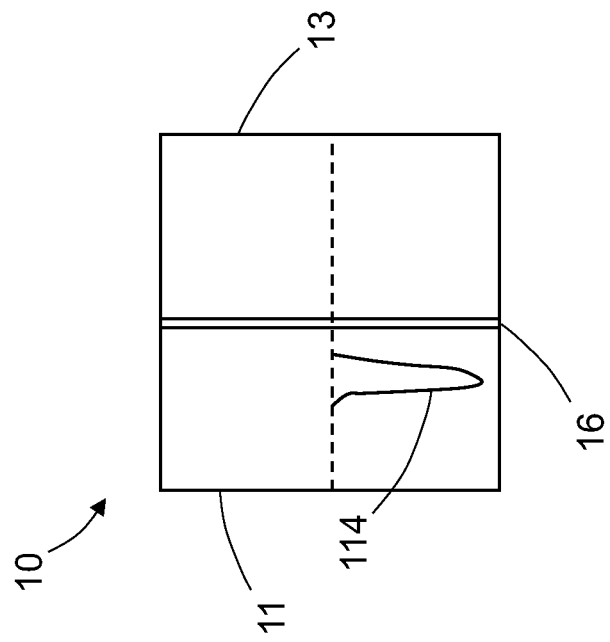

In the example scenario depicted in FIG. 1D, the first tension wave 110 combines with the second tension wave 112 to produce a tensile stress spike 114 in a region of the bonded structure 100 between the front free surface 11 and the bond 16.

Figure 2:
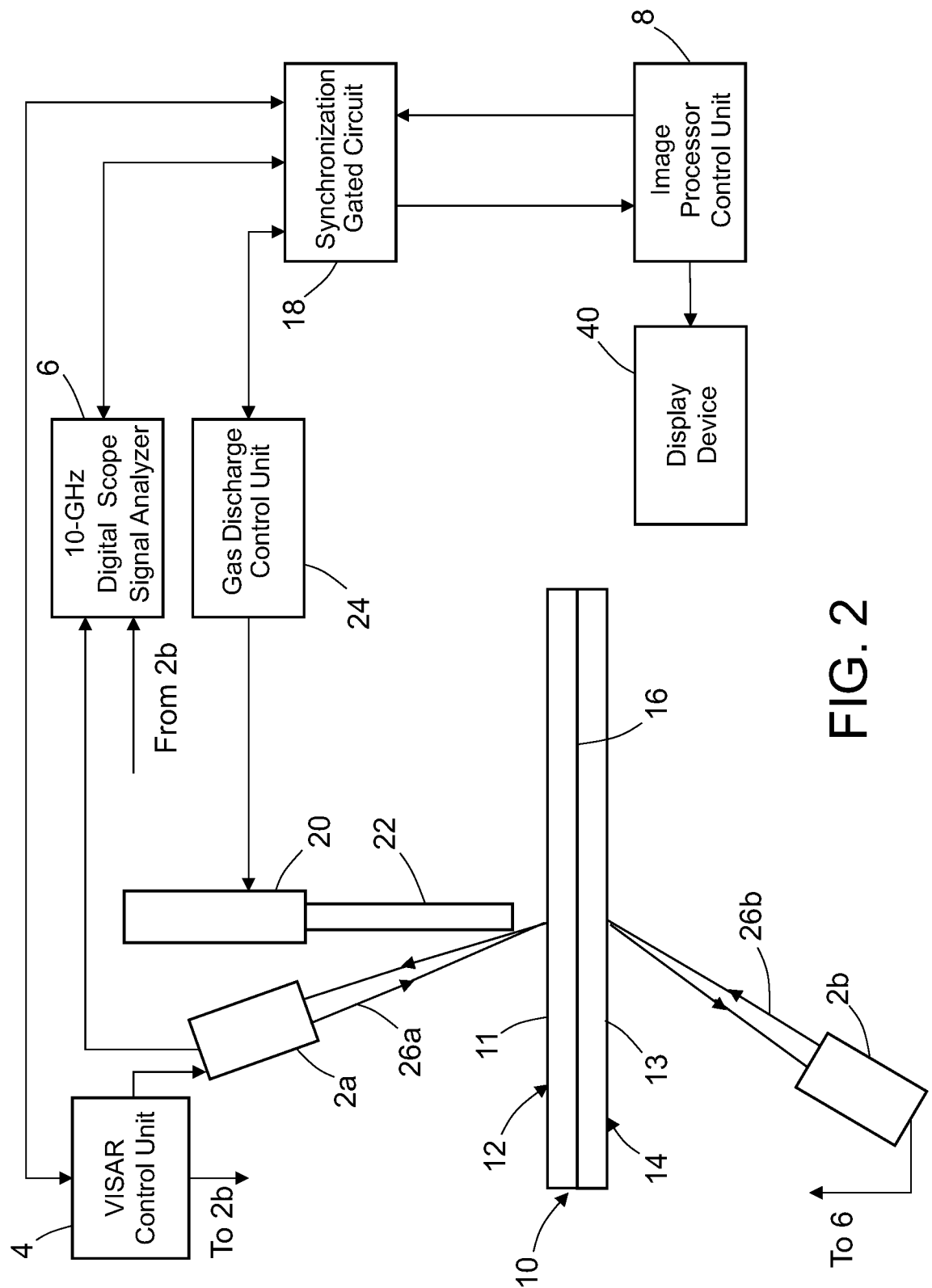
FIG. 2 is a diagram identifying or depicting components of a bondline inspection system in accordance with one embodiment comprising a VISAR synchronized with a high-pressure gas pulse for exciting a mechanical wave in a composite material.

FIG. 2 is a diagram identifying or depicting components of a bondline inspection system in accordance with one embodiment. The bondline inspection system includes a VISAR synchronized with a high-pressure gas pulse for exciting a mechanical wave in a bonded structure 10. The system depicted in FIG. 2 includes a bonded structure 10 consisting of a first composite structure 12 adhesively bonded to a second composite structure 14. The bonded structure 10 further includes a front free surface 11, a back free surface 13, and a bond 10.

The system shown in FIG. 2 includes a gas gun 20 having a gas gun nozzle 22. The gas gun nozzle 22 is positioned and configured to produce a gas pulse directed normal to a target area on the front free surface 11 of bonded structure 10. Pressurized gas is discharged by gas gun 20 in response to an activation signal received from a gas discharge control unit 34. The gas pulse has an energy sufficient to excite a compression wave in the bonded structure 10 which propagates in the thickness direction. A person of ordinary skill in the art will readily recognize that the degree of proximity of the gas gun nozzle 22 relative to the front free surface 11 may vary within any operable or workable range depending on the strength of the gas pulse.

In one non-limiting example, gas gun 20 may be a single-bore barrel, about 2 to 3 meters long, pressurized with nitrogen, argon, or helium. In another example, gas gun 20 may be a ballistic gas gun that uses compressed air as a propellant and comprises a cylindrical barrel, a quick release valve to release the trapped air, and a nitrogen (or similar) gas-driven solenoid valve to operate the quick release valve.

Still referring to FIG. 2, the system further includes a first interferometer 2a aimed at a target area (where the gas pulse is applied) on the front free surface 11, a second interferometer 2b aimed at a corresponding target area on the back free surface 13, and a VISAR control unit 4 which is connected and configured to activate the first interferometer 2a and second interferometer 2b concurrently.

The first interferometer 2a is located and configured to generate a first light beam (not shown in FIG. 2) in response to activation, split the first light beam into second and third light beams, direct the second light beam 26a toward the target area on the front free surface 11, direct the third light beam (not shown in FIG. 2) toward an internal mirror (not shown in FIG. 2), and then capture fringes produced by interference of reflected light of the second light beam 26a which has been reflected by the target area on the front free surface 11 with reflected light of the third light beam which has been reflected by the internal mirror.

Similarly, the second interferometer 2b is located and configured to generate a fourth light beam (not shown in FIG. 2) in response to activation, split the fourth light beam into fifth and sixth light beams, direct the fifth light beam 26b toward a target area on the back free surface 13, direct the sixth light beam (not shown in FIG. 2) toward an internal mirror (not shown in FIG. 2), and then capture fringes produced by interference of reflected light of the fifth light beam 26b which has been reflected by the target area on the back free surface 13 with reflected light of the sixth light beam which has been reflected by the internal mirror.

The VISAR control unit 4 is connected to the first interferometer 2a and configured to control activation of the first interferometer 2a. The VISAR control unit 4 is also connected to the second interferometer 2b and configured to control activation of the second interferometer 2b. The interferometers are activated concurrently.

Each interferometer of the VISAR creates a fringe pattern which shifts due to reflection of the emitted light beam from a moving free surface. A fringe shift is the behavior of a pattern of fringes when the phase relationship between the component sources change. In effect, the interferometer measures the Doppler shift in light frequency given to the reflected laser beam. The number of fringes is proportional to the free-surface velocity. VISAR data consists of recordings of the light intensity outputs from the VISAR interferometer as a function of time. The free-surface velocity change which causes a fringe shift of one fringe is called the VISAR's velocity-per-fringe (VPF) constant. To calculate the free-surface velocity, the fringe count is multiplied by the VPF constant of the interferometer. Repeating this procedure for each time increment provides free-surface velocity as a function time.

The light fringes produced by the interferometers are recorded using light detectors, such as photomultipliers, to change the fringe light intensity variations into voltage variations. A digital oscilloscopes may be used to record the voltage variations. The voltage versus time data points collected by the oscilloscope can then be analyzed in a computer program to obtain the velocity versus time of the measured target area on the free surface during testing.

Therefore, the system depicted in FIG. 2 further includes a signal analyzer 6 (e.g., a 10-GHz digital scope signal analyzer) which is used to monitor the gas gun incoming triggering signal and VISAR timing. The signal analyzer 6 is connected to receive first analog data representing captured fringes from the first interferometer 2a and second analog data representing captured fringes from the second interferometer 2b. The signal analyzer 6 is configured to convert the first analog data to first digital data representing the fringes captured by the first interferometer 2a and convert the second analog data to second digital data representing the fringes captured by the second interferometer 2b. More specifically, the incoming signal is down-converted to a much lower intermediate frequency (IF). This IF signal is sampled, digitized by an analog-to-digital converter, and processed using digital signal processing techniques. Signals arriving at the oscilloscope's front end are sampled and processed digitally, but at high rates (e.g., 100 GHz).

The signal analyzer 6 sends the acquired digital data to an image processor control unit 8 (hereinafter "electronic image processor 8") by way of a synchronization gated circuit 18 which is also connected to VISAR control unit 4 and gas discharge control unit 34. The operations of gas discharge control unit 34, VISAR control unit 4, and signal analyzer 6 are synchronized by synchronization gated circuit 18 under the control of electronic image processor 8. In accordance with one embodiment, electronic image processor 8 includes high-speed random access memory (RAM) which receives the digital data. The electronic image processor 8 in configured to execute an algorithm in which the fringes indicated in the digital data are counted and then the velocities and displacements of the free surfaces of the bonded structure 10 are calculated. The digital fringes received from the signal analyzer 6 may be presented for viewing on the screen of a display device 40 which is connected to electronic image processor 8.

The electronic image processor 8 and display device 40 may be components of a computer system that includes one or more data processors. The computer system may also include one or more memory devices that serve as a main memory during the operation of the electronic image processor 8. For example, during operation, a copy of the software that supports the operations described herein may be stored in a memory device. The computer system may include one or more peripheral interfaces, such as keyboards, mice, touchpads, and touchscreens, for enabling human interaction with the computer system. The computer system may also include one or more network interfaces for communicating via one or more networks, such as Ethernet adapters, wireless transceivers, or serial network components, for communicating over wired or wireless media using protocols. The computer system may also include one or more nontransitory tangible computer-readable storage media, such as flash drives, hard drives, RAM, etc., for storing data, such as images, files, and program instructions for execution by the one or more processors.

Additionally, the computer system hosting the electronic image processor 8 may include one or more software programs that enable the functionality described herein. The one or more software programs may include instructions that cause the one or more processors to perform the processes, functions, and operations described herein.

In accordance with the embodiments disclosed herein, the electronic image processor 8 is configured (e.g. programmed) to calculate a first estimated surface velocity of the target area on the front free surface 11 and a second estimated surface velocity of the target area on the back free surface 13 during a period of time subsequent to production of the gas pulse using the first and second digital data respectively, which are received from the signal analyzer 6. The free-surface velocity is derived by multiplying the fringe count by the VPF constant of the interferometer.

The electronic image processor 8 is further configured to calculate a first estimated displacement of the target area on the front free surface 11 using the first estimated surface velocity and calculate a second estimated displacement of the target area on the back free surface 13 using the second estimated surface velocity. The free-surface displacement is derived by integrating the free-surface velocity over time.

The electronic image processor 8 then compares the first and second estimated displacements to a weak bond threshold displacement value. More specifically, the electronic image processor 8 is configured to conclude that the bond 16 in bonded structure 10 is weak when any one of the first estimated displacement, the second estimated displacement, or a weighted average of the first and second estimated displacements exceeds the weak bond threshold displacement value.

The first composite structure 12 of the bonded structure 10 may be bonded to the second composite structure 14 by means of adhesive that forms bond 16. The adhesive may comprise, for example, film or paste epoxy. In most applications, it is preferred that the first composite structure 12 and second composite structure 14 be made of dissimilar materials, as composite structures made of the same material tend to transmit, not reflect impinging waves across the interface of the two materials. As used herein, dissimilar means the materials have different densities and/or different acoustic impedances.

The ease with which a pressure or stress wave travels through a material depends on a property of the material called acoustic impedance (Z). The acoustic impedance of a material is defined as the product of the density of the material and its acoustic wave speed (i.e., the speed that sound travels through the material). Acoustic impedance is important in determining the acoustic transmission and reflection at the interface of two materials having different acoustic impedances. The greater the difference between the acoustic impedances of two materials at an interface in a composite structure, the greater the amount of reflection.

With respect to the present disclosure, when a pressure wave encounters a difference in the acoustic impedance of a material, the pressure wave reflects in a way that depends on whether the pressure wave is moving from a material with high impedance to a material with low impedance, or a material with low impedance to a material with high impedance. For instance, when a pressure wave travels from a material that has a high acoustic impedance to one that has a low impedance, the pressure wave will reflect at the interface and change either from compression to tension, or from tension to compression. In the alternative, a pressure wave reflects in compression when a pressure wave travels from a material that has a low acoustic impedance to one that has a higher acoustic impedance.

Although the embodiment depicted in FIG. 2 include two interferometers, the bond 16 may be tested using only one of the two interferometers. For example, in one alternative embodiment, interferometer 2a may be used without interferometer 2b. In another alternative embodiment, interferometer 2b may be used without interferometer 2a.

Figure 3:
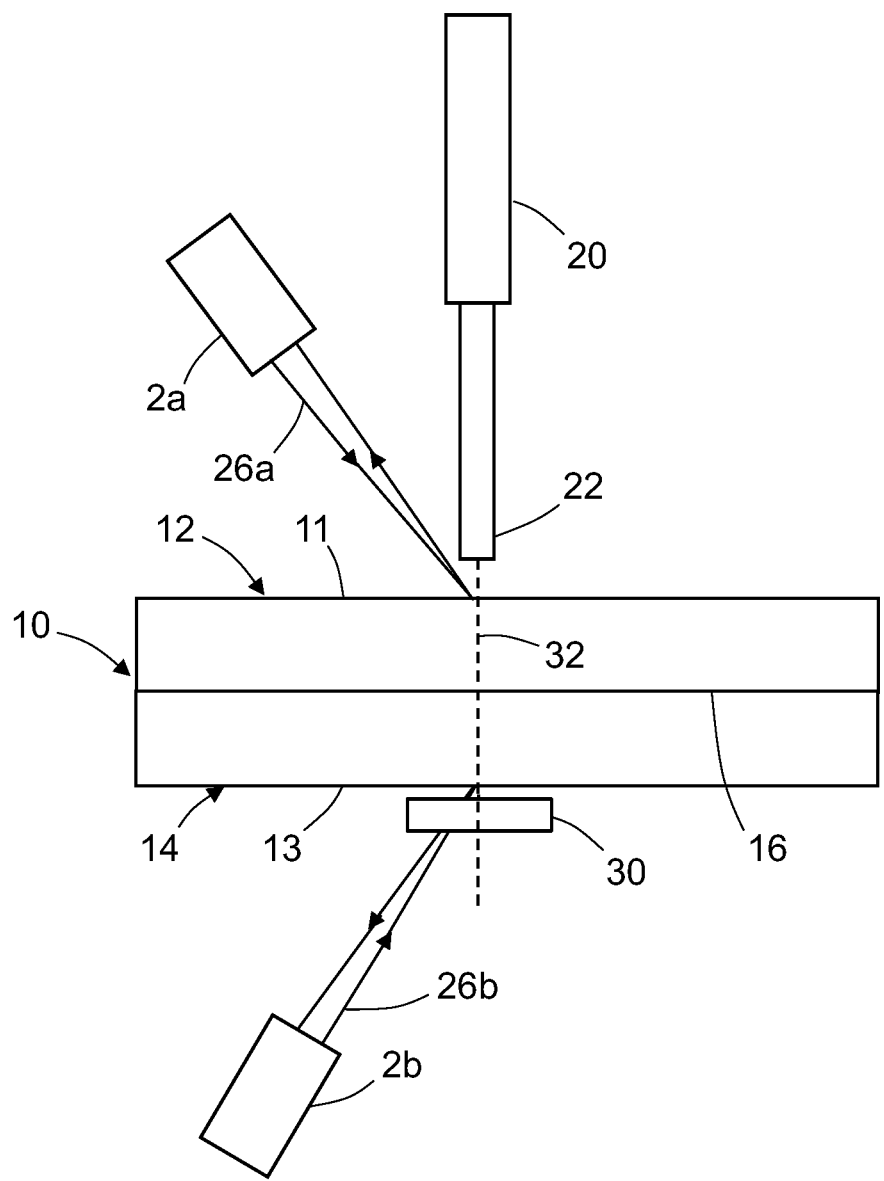
FIG. 3 is a diagram identifying or depicting components of a bondline inspection system in accordance with another embodiment that further includes a ring magnet for aligning a VISAR beam with a center of a gas gun nozzle.

FIG. 3 is a diagram identifying or depicting components of a bondline inspection system in accordance with another embodiment that further includes a ring magnet 30 for aligning the laser spot of laser beam 26b exactly under the gas gun nozzle 22. The ring magnet 30 may be in the form of a circular ring having a center. The ring magnet self-aligns exactly under the gas gun nozzle 22 on the opposite side of a bonded structure 10 made of composite material. In an ideal setup, the center of ring magnet 30 is intersected by the center axis 32 of the gas gun nozzle 22. The laser beam 26b may then be aimed at the center of the ring magnet 30.

Figure 4:
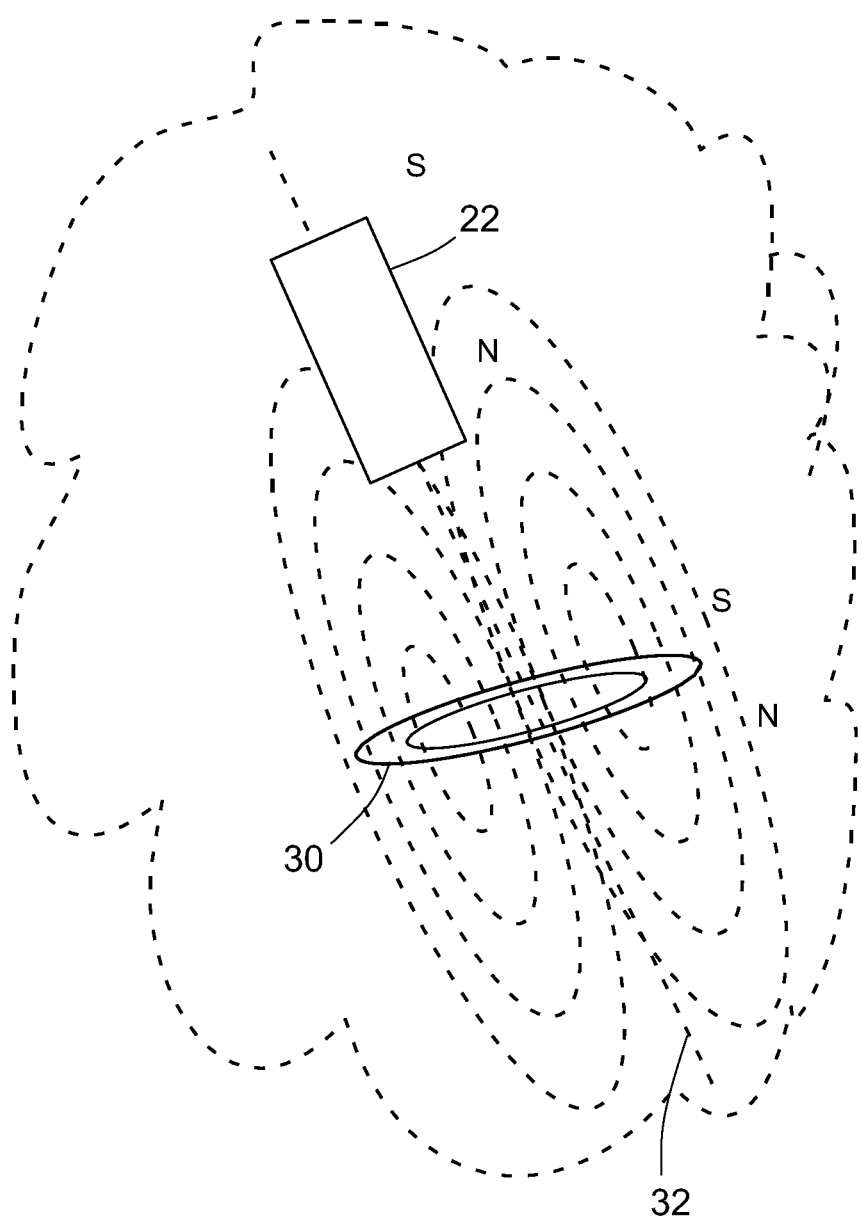
FIG. 4 is a diagram showing field lines (indicated by dashed ellipses) representing the magnetic field produced by a ring magnet which is aligned with a gas gun nozzle.

FIG. 4 is a diagram showing field lines (indicated by dashed ellipses) representing the magnetic field produced by a ring magnet 30 which is aligned with a gas gun nozzle 22. The ring magnet 30 always adjusts its field to align with the gas gun nozzle 22 through the composite part.

Figure 5:
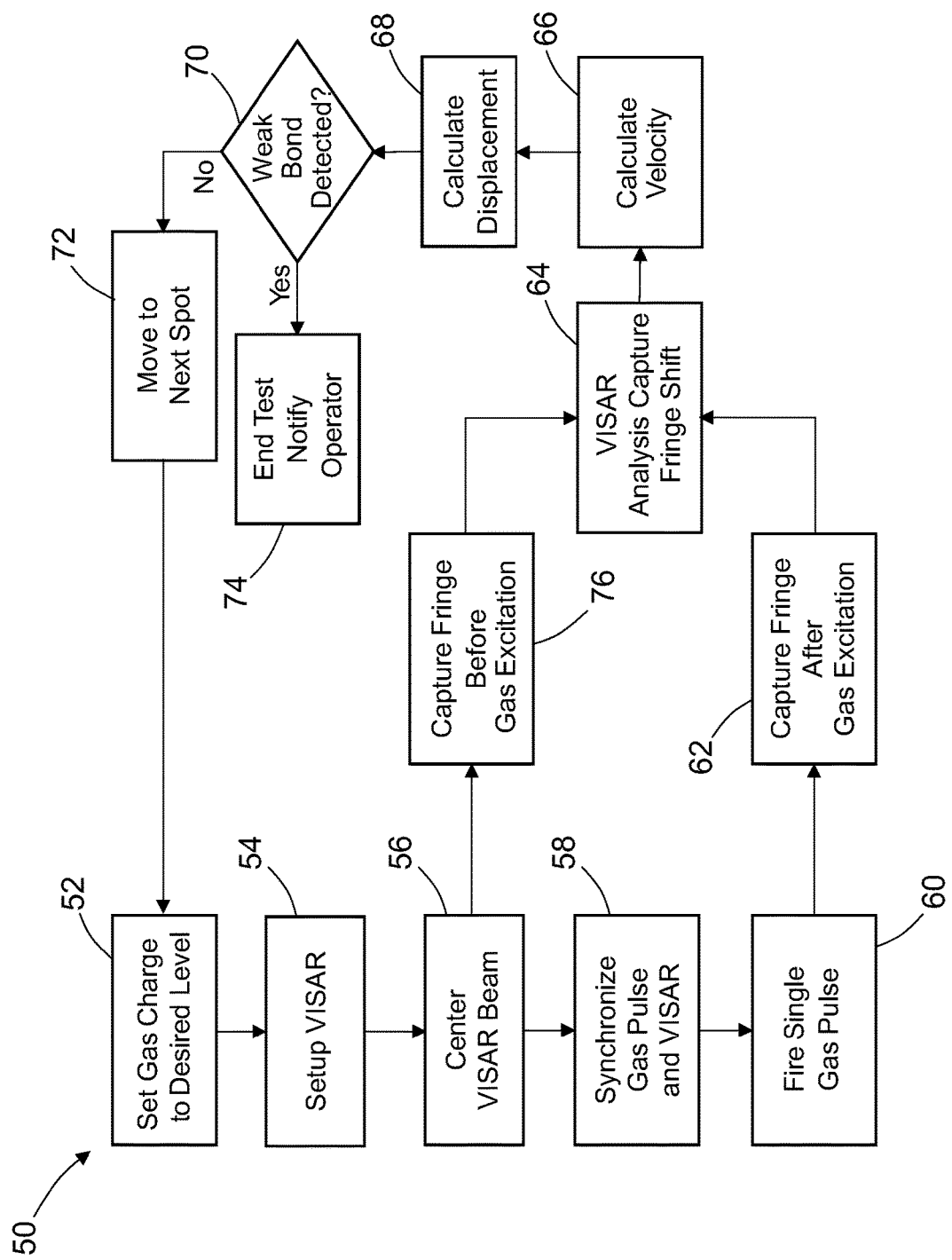
FIG. 5 is a flowchart identifying steps of a method for inspecting a bondline using mechanical wave measurement and gas excitation.

FIG. 5 is a flowchart identifying steps of a method 50 for inspecting a bondline using mechanical wave measurement and gas excitation. Method 50 begins by setting a gas charge to a desired level (step 52). Then the VISAR is set up as generally indicated in FIG. 2 (step 54). Then the first interferometer 2a is aimed so that laser beam 26a will be centered in the target area on the front free surface 11 (see FIG. 2) where the gas pulse is applied (step 56). If the second interferometer 2b is employed, then the second interferometer 2b is aimed so that laser beam 26b will be centered in the target area on the back free surface 13 (see FIG. 2).

Method 50 continues by capturing fringes before gas excitation (step 58). Thereafter, the gas discharge control unit 34 and the VISAR control unit 4 (see FIG. 2) are synchronized so that the light sources of the interferometers 2a and 2b will be activated simultaneously with the discharge of gas gun 20 (step 58). Then a single gas pulse is fired (step 60). The resulting fringes are captured after gas excitation (step 62).

After images of the fringes pre- and post-gas excitation have been acquired, the VISAR analysis software of the electronic image processor 8 calculates the fringe shift for each interferometer (step 64). Then the estimated surface velocity of the target area on each free surface is calculated (step 66). Next the estimated displacements of the target areas on the free surfaces are calculated using the respective estimated surface velocities (step 68). Then a determination is made whether the detected bond is weak or not by comparing the estimated displacement to a weak bond threshold displacement value (step 70). On the one hand, if a determination is made in step 70 that the detected bond is not weak, then method 50 continues by moving the test equipment to a next spot for inspection (step 72). On the other hand, if a determination is made in step 70 that the detected bond is weak, then the test is ended and the operator is notified (step 74). The operator may then designate the bonded structure for reworking, repair or replacement.

Figure 6:
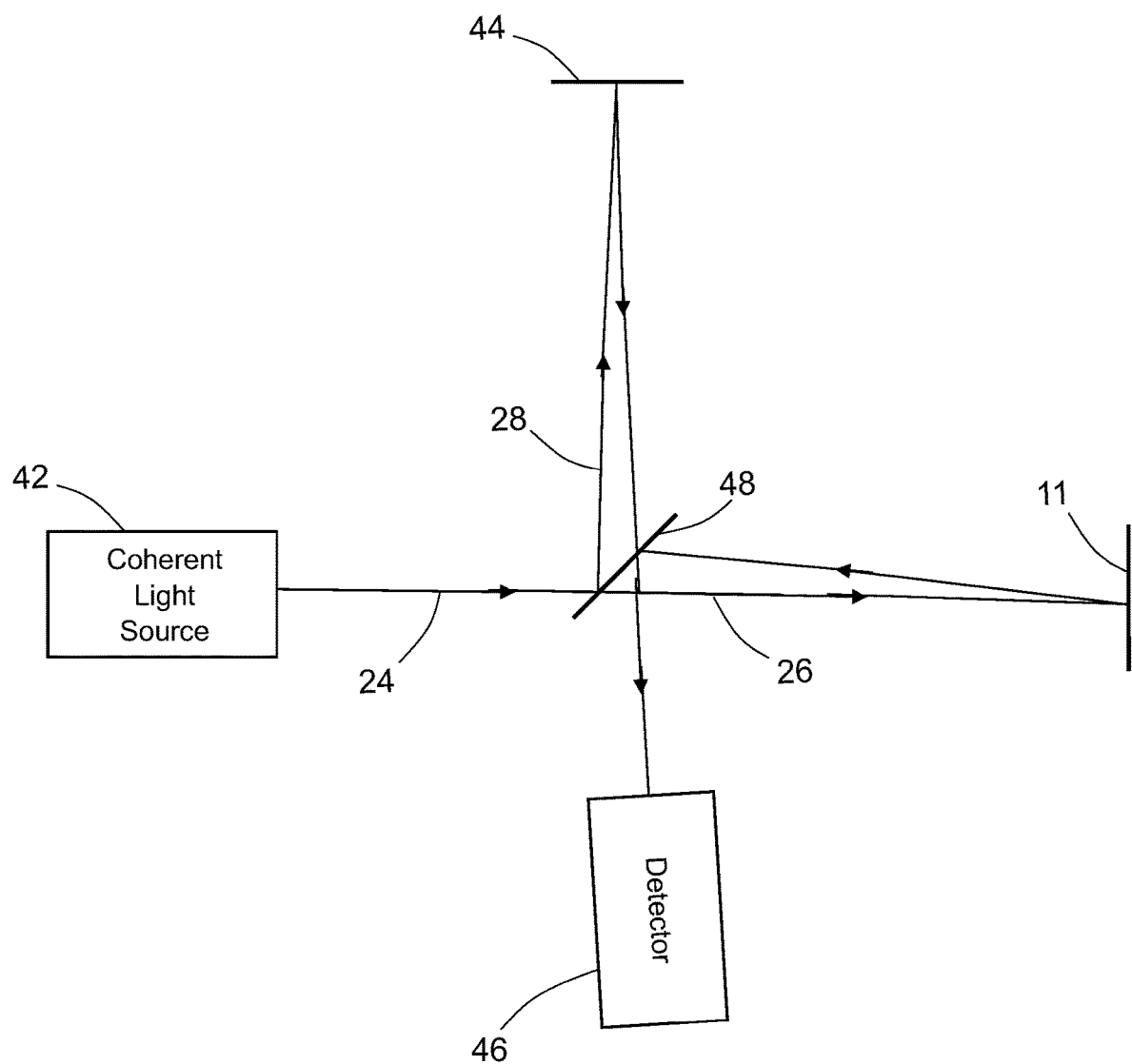
FIG. 6 is a diagram showing a light path through a typical interferometer.

For the sake of completeness, the operation of the interferometers will be described in more detail. FIG. 6 is a diagram showing the paths of light through a typical interferometer that includes a coherent light source 42. The interferometer further includes a beam splitter 48 (e.g., a half-silvered mirror) which is positioned in the path of a first light beam 24 emitted by the coherent light source 42. The beam splitter 48 splits the first beam 24 into a second light beam 26 and a third light beam 28. The second light beam 26 is transmitted toward a moving front free surface 11 of a composite structure. The third light beam 28 is reflected toward a stationary internal mirror 44. The light rays of the second beam 28 which are reflected by the stationary internal mirror 44 back to the beam splitter 48, are transmitted through the beam splitter 48 and then impinge on a detector 46. The light rays of the third beam which are reflected back to the beam splitter 48 by the moving front free surface 11 are reflected toward the detector 46. The impinging light rays of the second and third light beams 26 and 28 may either interfere constructively (strengthening in intensity) if their light waves arrive in phase, or interfere destructively (weakening in intensity) if they arrive out of phase, depending on the distance separating stationary internal mirror 44 and beam splitter 48, and the distance separating front free surface 11 and beam splitter 48.

In accordance with examples of the present disclosure, a bondline inspection system is provided for determining a bond strength between bonded parts. The bondline inspection system uses fringe interference images taken before and during or after probing by a gas excitation system to determine the bond strength. This approach allows for a non-destructive inspection system that can be used at or near a location of bonding to determine the strength of the bond and/or detect inconsistencies to the bond that occur in response to the contact with a compression wave and/or tensile wave. If the inspection reveals that the bond has separated during excitation because of a microfracture or delamination, then the quality of the bond can be determined to be faulty, i.e., the bond did not pass inspection. Alternatively, the bond could contain inconsistencies. If the inspection reveals that the bonded area is neither fractured nor broken, then the strength of the bond can be determined, i.e., the bond passes or does not pass inspection depending on a threshold to determine if a bond passes. In some examples, a predetermined tension force can be applied to the bond. The predetermined force can be about 30% to about 70% of the force required to break an ideal bond. The bond can then be inspected as described herein. The parts being bonded can be employed in a wide range of industries, including, but are not limited to, aerospace industries.

While systems and methods for bondline inspection using mechanical wave measurement and gas excitation have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

In the method claims appended hereto, any alphabetic ordering of steps is for the sole purpose of enabling subsequent short-hand references to antecedent steps and not for the purpose of limiting the scope of the claim to require that the method steps be performed in alphabetic order.

The invention claimed is:

1. A system for testing a strength of a bond in a bonded structure, the system comprising:
   a gas gun positioned and configured to produce a gas pulse directed normal to a target area on a front free surface of the bonded structure, the gas pulse having an energy sufficient to excite a compression wave;
   a first interferometer located and configured to generate a first light beam in response to activation, split the first light beam into second and third light beams, direct the second light beam toward the target area on the front free surface, direct the third light beam toward an internal mirror, and then capture fringes produced by interference of reflected light of the second light beam which has been reflected by the target area on the front free surface with reflected light of the third light beam which has been reflected by the internal mirror;
   an interferometer control unit connected to the first interferometer and configured to control activation of the first interferometer;
   a signal analyzer connected to receive first analog data representing captured fringes from the first interferometer and configured to convert the first analog data to first digital data representing the fringes captured by the first interferometer;
   a synchronization gated circuit connected and configured to synchronize operation of the gas gun, the interferometer control unit, and the signal analyzer; and
   an electronic image processor connected to receive the first digital data from the signal analyzer and configured to calculate a first estimated surface velocity of the target area on the front free surface during a period of time subsequent to production of the gas pulse, using the first digital data.

2. The system as recited in claim 1, wherein the electronic image processor is further configured to calculate a first estimated displacement of the target area on the front free surface, using the first estimated surface velocity.

3. The system as recited in claim 2, wherein the electronic image processor is further configured to compare the first estimated displacement to a weak bond threshold displacement value.

4. The system as recited in claim 3, further comprising a second interferometer located and configured to generate a fourth light beam in response to activation, split the fourth light beam into fifth and sixth light beams, direct the fifth light beam toward a target area on a back free surface, direct the sixth light beam toward an internal mirror, and then capture fringes produced by interference of reflected light of the fifth light beam which has been reflected by the target area on the back free surface with reflected light of the sixth light beam which has been reflected by the internal mirror.

5. The system as recited in claim 4, wherein:
   the interferometer control unit is connected to the second interferometer and further configured to control activation of the second interferometer;
   the signal analyzer is connected to receive second analog data representing captured fringes from the second interferometer and further configured to convert the second analog data to second digital data representing the fringes captured by the second interferometer; and
   the electronic image processor is further configured to calculate a second estimated surface velocity of the target area on the back free surface during the period of time subsequent to production of the gas pulse, using the second digital data.

6. The system as recited in claim 5, wherein the electronic image processor is further configured to calculate a second estimated displacement of the target area on the front free surface, using the second estimated surface velocity, and then compare the second estimated displacement to the weak bond threshold displacement value.

7. The system as recited in claim 6, wherein the electronic image processor is further configured to conclude that the bond is weak when any one of the first estimated displacement, the second estimated displacement, or a weighted average of the first and second estimated displacements exceeds the weak bond threshold displacement value.

8. The system as recited in claim 5, further comprising a ring magnet positioned and configured to surround a volume of space adjacent to the target area on the back free surface in alignment with the gas gun.

9. A method for determining a strength of a bond in a bonded structure, the method comprising:
   producing a gas pulse that is directed normal to a target area on a front free surface of the bonded structure, the gas pulse having an energy sufficient to excite a compression wave;
   activating a light source to generate a first light beam;
   splitting the first light beam into second and third light beams;
   directing the second light beam toward the target area on the front free surface;
   directing the third light beam toward a stationary mirror;
   capturing fringes produced by interference of reflected light of the second light beam which has been reflected by the target area on the front free surface with reflected light of the third light beam which has been reflected by the stationary mirror;
   converting analog data representing the captured fringes to digital data representing the captured fringes; and
   calculating an estimated surface velocity of the target area on the front free surface during a period of time subsequent to production of the gas pulse, using the digital data.

10. The method as recited in claim 9, further comprising calculating an estimated displacement of the target area on the front free surface, using the estimated surface velocity.

11. The method as recited in claim 10, further comprising comparing the estimated displacement to a weak bond threshold displacement value.

12. The method as recited in claim 11, further comprising designating the bonded structure for reworking, repair or replacement when the estimated displacement exceeds the weak bond threshold displacement value.

13. A system for testing a strength of a bond in a bonded structure, the system comprising:
   a gas gun positioned and configured to produce a gas pulse directed normal to a target area on a front free surface of the bonded structure, the gas pulse having an energy sufficient to excite a compression wave;
   an interferometer located and configured to generate a first light beam in response to activation, split the first light beam into second and third light beams, direct the second light beam toward a target area on a back free surface of the bonded structure, direct the third light beam toward an internal mirror, and then capture fringes produced by interference of reflected light of the second light beam which has been reflected by the target area on the back free surface with reflected light of the third light beam which has been reflected by the internal mirror;
   an interferometer control unit connected to the interferometer and configured to control activation of the interferometer;
   a signal analyzer connected to receive analog data representing captured fringes from the interferometer and configured to convert the analog data to digital data representing the fringes captured by the interferometer;
   a synchronization gated circuit connected and configured to synchronize operation of the gas gun, the interferometer control unit, and the signal analyzer; and
   an electronic image processor connected to receive the digital data from the signal analyzer and configured to calculate an estimated surface velocity of the target area on the back free surface during a period of time subsequent to production of the gas pulse, using the digital data.

14. The system as recited in claim 13, wherein the electronic image processor is further configured to calculate an estimated displacement of the target area on the back free surface, using the estimated surface velocity.

15. The system as recited in claim 14, wherein the electronic image processor is further configured to compare the estimated displacement to a weak bond threshold displacement value.

16. The system as recited in claim 15, wherein the electronic image processor is further configured to conclude that the bond is weak when the estimated displacement exceeds the weak bond threshold displacement value.

17. The system as recited in claim 13, further comprising a ring magnet positioned and configured to surround a volume of space adjacent to the target area on the back free surface in alignment with the gas gun.

18. A method for determining a strength of a bond in a bonded structure, the method comprising:
   producing a gas pulse that is directed normal to a target area on a front free surface of the bonded structure, the gas pulse having an energy sufficient to excite a compression wave;
   activating a light source to generate a first light beam;
   splitting the first light beam into second and third light beams;
   directing the second light beam toward a target area on a back free surface of the bonded structure;
   directing the third light beam toward a stationary mirror;
   capturing fringes produced by interference of reflected light of the second light beam which has been reflected by the target area on the back free surface with reflected light of the third light beam which has been reflected by the stationary mirror;
   converting analog data representing the captured fringes to digital data representing the captured fringes; and
   calculating an estimated surface velocity of the target area on the back free surface during a period of time subsequent to production of the gas pulse, using the digital data.

19. The method as recited in claim 18, further comprising:
   calculating an estimated displacement of the target area on the back free surface, using the estimated surface velocity; and
   comparing the estimated displacement to a weak bond threshold displacement value.

20. The method as recited in claim 17, further comprising placing a ring magnet in a position adjacent to the target area on the back free surface of the bonded structure and in alignment with the gas gun.

* * * * *